United States Patent [19]
Neuling

[11] Patent Number: 5,718,534
[45] Date of Patent: Feb. 17, 1998

[54] REAR DRIVE RIDE-ON TRACTOR UNIT FOR PROPELLING STEERABLE UTILITY VEHICLES SUCH AS WALK-BEHIND PAINT STRIPERS

[75] Inventor: William V. Neuling, Greenville, Ind.

[73] Assignee: Fine Line Plastics Corp., Greenville, Ind.

[21] Appl. No.: 647,597

[22] Filed: Mar. 13, 1996

[51] Int. Cl.⁶ .............................. E01C 23/16; B62D 59/04
[52] U.S. Cl. .............................. 404/94; 180/11; 180/326; 280/32.7; 280/400
[58] Field of Search .............................. 404/93, 94; 239/150, 239/172; 180/14.2, 14.3, 11, 326, 330; 280/32.7, 400; 296/63, 64, 65.1; 297/311, 217.7, 344.1, 344.11

[56] References Cited

U.S. PATENT DOCUMENTS

| | | | |
|---|---|---|---|
| 3,052,077 | 9/1962 | Gustafson et al. | |
| 3,485,314 | 12/1969 | Herr. | |
| 3,540,358 | 11/1970 | Oakley | 404/94 X |
| 3,540,632 | 11/1970 | Clingan | 239/150 X |
| 3,575,250 | 4/1971 | Dykes | 180/11 |
| 4,505,356 | 3/1985 | Baier et al. | 180/326 X |
| 4,624,602 | 11/1986 | Kieffer et al. | |
| 4,861,190 | 8/1989 | Glassel. | |
| 5,263,789 | 11/1993 | Torntore et al. | 404/93 |
| 5,368,232 | 11/1994 | Schroeder. | |
| 5,564,721 | 10/1996 | Wians | 280/32.7 |

Primary Examiner—James Lisehora
Attorney, Agent, or Firm—Laurence R. Brown

[57] ABSTRACT

Improved paint striper control, speed and quality is achieved by articulating a motor driven push tractor unit to a steerable walk behind paint striping unit. In a preferred embodiment, a two wheeled rear push tractor unit supporting a drive motor and driver's seat is coupled through a quick release ball-socket pivot joint behind a three wheeled handlebar steered push-to-paint manual striping unit. The articulation joint with help of a hydrostatic trans-axle transmission in the tractor unit produces a sharp turning eighty degree radius. Also the transmission unit functions to drive the assembly in straight lines. The user controls steering to deviate from a straight line at the handlebar grips in substantially the same manner as if walking behind the paint striper. Thus the user rides quickly along the striping path with a good view at the paint spray jets to monitor performance and achieve higher output volume and quality.

13 Claims, 4 Drawing Sheets

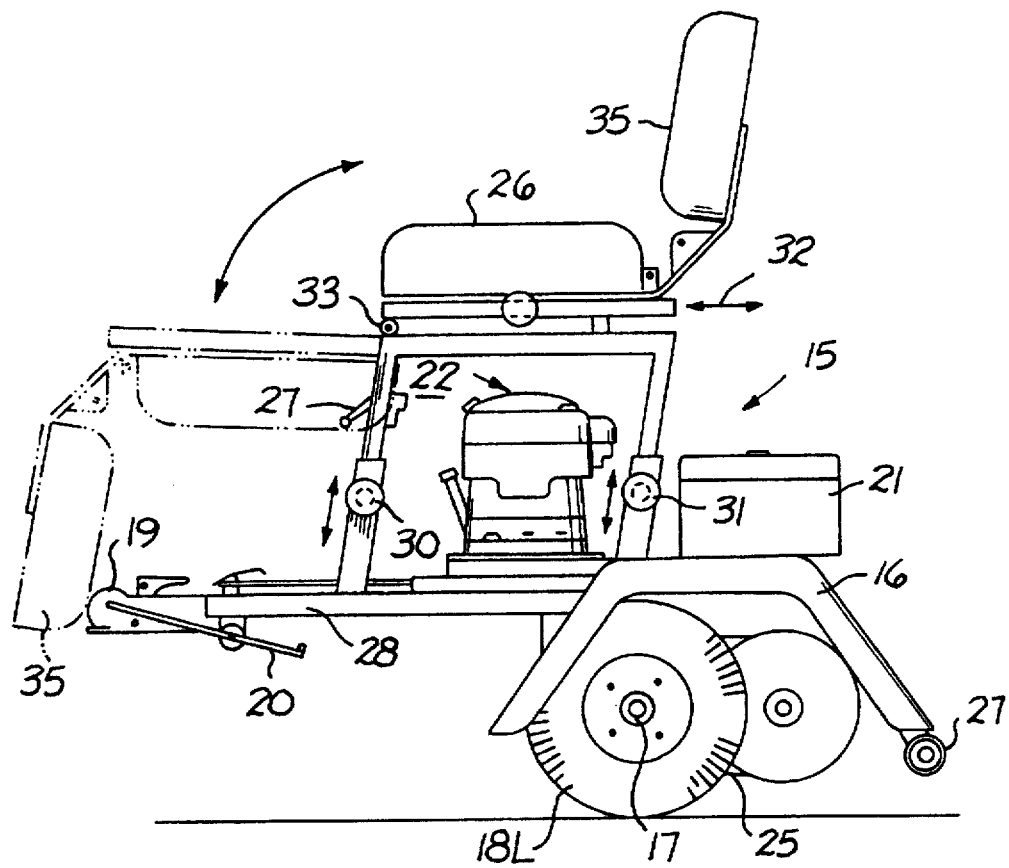
FIG. I
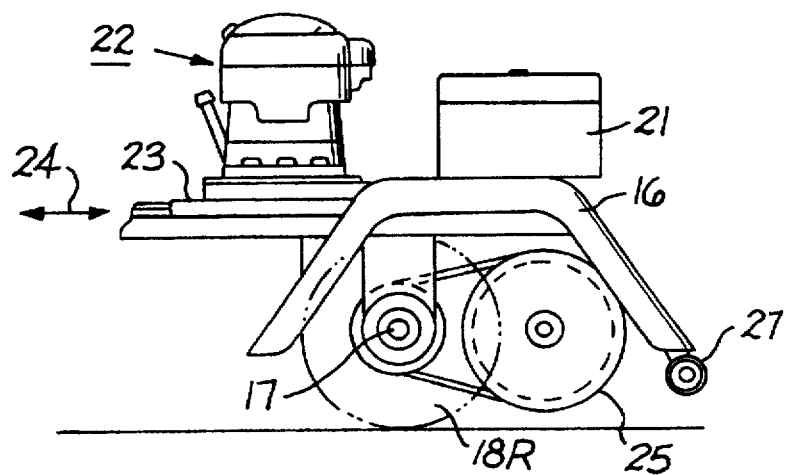
FIG. IA

REAR DRIVE RIDE-ON TRACTOR UNIT FOR PROPELLING STEERABLE UTILITY VEHICLES SUCH AS WALK-BEHIND PAINT STRIPERS

TECHNICAL FIELD

This invention relates to push drive tractor locomotion units and driven utility vehicles linked thereto, and more particularly it relates to articulated motor driven utility vehicles, typically paint striping machines of the type used to stripe parking lots and airport runways.

BACKGROUND ART

In the paint striping industry, a line of smaller striping machines have been developed for use in parking lots, airport runways and the like, as compared with larger striping machines for long distance, high speed highway use. These larger machines, which are generally attached to a truck and are useful in striping long stretches of highway, are typified by the Schroeder U.S. Pat. No. 5,368,232 for STRIPING APPARATUS. FOR VEHICLE TRAVEL SURFACES, Nov. 29, 1994. Such machines may move at high speeds along a highway and rarely provide visibility enough for a single person to drive along the highway while monitoring and controlling the paint striping machinery. Nor do such machines have the versatility to paint up to the edge of a curb or wall, or to maneuver flexibly about painting line patterns in parking lots in patterns where the machines do not pass over wet paint.

By contrast, the smaller more versatile machines to which this invention is directed can be manipulated for different types of striping patterns and can abut stripes up to a wall or curb, even in quite small parking lots, for example.

A typical single person operated machine, is set forth in the Kieffer, et al. U.S. Pat. No. 4,624,602 for PARKING LOT STRIPER, Nov. 25, 1986. This is a three wheeled manually pushed-from-behind vehicle steered by handlebars. These machines are maneuverable enough to work in cramped quarters such as for painting intricate parking space striping patterns under dynamic control of a walking operator for both steering and painting as the user grasps the handlebars and associated painting control levers.

Another line of smaller motorized utility vehicles for single person use while riding are known in the art, such as lawnmowers for example or the article carrying .vehicle of the Herr U.S. Pat. No. 3,485,314 for ARTICLE CARRYING VEHICLE WITH OPTIONAL STOWABLE RIDING ATTACHMENT, Dec. 23, 1969. This sets forth a handlebar steered, motor propelled utility vehicle, with a trailing scooter platform articulated to the motor powered front drive unit for the user to ride behind the motor propelled utility vehicle while steering by the handlebars.

A ride-on, one-person, motorized striping machine is set forth in Gustafson, et al. U.S. Pat. No. 3,052,077 for LINE MARKING MACHINE, Sep. 4, 1962. This is a combination special purpose grass cutter and striper for striping lines on a ball field with lime, which is mounted on a motor-driven, handlebar-steered tricycle for cutting grass strips and liming them to produce yard marker lines on a football field.

A small, single person operated parking lot striping machine more closely related to the present invention is found in Glassel, U.S. Pat. No. 4,861,190 for RIDE-ON ROAD STRIPERS, Aug. 29, 1989. This machine is articulated in the midsection to form rear frame and front frame units permanently bound together about a pivot axis. A single motor in the rear section serves the dual purpose of propelling the vehicle with the rider sitting on the front unit and pumping paint from storage in the rear unit to paint spraying dispensers at the front of the front section. This arrangement and the use of a single dual purpose motor leads to significant problems of inter-unit connections, requiring a steering mechanism, motor drive belts and paint delivery lines to be shared between the two units while providing for articulation of the front and rear sections. Furthermore, because the paint dispenser is located between the wheels, dispensing paint from between the wheels is a significant disadvantage, such as for making a circular pattern or for dead ending at a wall or curb, which would require running the wheels across the fresh paint.

There are other general unsolved problems existing in this art, which are addressed by the present invention, including the following:

(1) There are several types of manually propelled commercial walk-behind paint stripers now available which are explicitly designed for acceptable performance of the painting function in a one-person controlled machine suitable for small parking lot type jobs. However, the output capability of these machines is limited to walking speed, typically one MPH, and thus they are not generally adaptable for cost-effective and time-effective use in intermediate sized jobs such as airport runways and large parking lots. It would be desirable to improve the striping speeds of these units, which generally have paint striping systems capable of higher painting speed capacity.

This present invention provides a rear-drive motor power tractor unit that converts these manually operated paint stripers into more efficient, higher speed stripers that do not fatigue operators and which significantly improve output painting efficiency and reduces job time and cost. Furthermore this rear drive unit adopts all the capabilities of existing units including steerability in a way that does not obsolete the currently available state of striper machinery technology nor prevent the hand powered mode of use whenever desirable by simply disconnecting the tractor drive unit.

(2) The currently available manually propelled paint stripers are not operable in a reverse movement mode, because an operator could not precisely enough control the striping while backing up. The visual monitoring of the painting would be interrupted by attempts to steer in reverse thus significantly reducing the probabilities of following a desired striping pattern. Yet many striping jobs, including parking stalls in a parking lot and relatively wide interrupted stripes required on airport runways, could be much more efficiently achieved by a forward and reverse striping machine which can lay down side-by-side stripes without turning the vehicle around.

(3) On motorized ride-on stripers, visibility of the steerer and paint stripe controller operator is usually compromised, particularly when commercial striping machines are versatile enough to paint from either right or left side of the vehicle. For precise work with straight lines the vehicle must be guided along a marker such as a string or a former stripe. This problem becomes even more acute if the striping pattern involves curves. However ride-on seats are typically arbitrarily placed in the center of the vehicle with the result that an operator cannot get a good view perspective for following painting patterns visible from striping on the left or right side of the vehicle. Many machines, including hand pushed stripers, are difficult to steer along a perfectly straight line.

(4) Paint striping machinery is transported from job site to job site frequently, but by nature may be awkward in shape and not easily stowed or stowable into compact storage space for transport, for example in a small pickup truck.

Accordingly the present invention produces an improved ride on paint striping machine that solves the foregoing problems and improves the state of the prior art. Other objects, features, and advantages of the invention will be found throughout the following description and claims and in the accompanying drawings.

DISCLOSURE OF THE INVENTION

This invention provides a rear-drive, ride-on, propulsion tractor rear unit connectable to a manual push from behind paint striper front unit by a trailer hitch type of ball-socket coupler at an articulation joint while isolating tractor propulsion functions in the rear unit and painting functions in the front unit.

Improved paint striper control, higher painting speed and better striper maneuverability is achieved by articulating the motor driven push tractor rear unit to a steerable walk behind paint striping front unit.

In a preferred embodiment, a two-wheeled, rear-push tractor unit carrying a drive motor and driver's seat is coupled through a quick release ball-socket pivot joint behind a three-wheeled, handlebar-steered, push-to-paint manual striping unit. The ball-socket articulation joint with the motor driven tractor unit produces a sharp turning radius, typically eighty degrees, with the user having control of painting functions at controls arranged alongside the handlebar grips in the same manner as when walking behind the paint striper unit. Thus the user rides along the striping path at a higher speed with a good view at the paint jets to monitor performance and achieve higher output, without fatigue and with high maneuverability.

A reversible motor drive facility provides for painting side-by-side stripes without turning the striper around or returning to a remote end of a stripe to start an adjacent stripe.

Also the tractor unit drive facilitates laying down straight lines.

Thus, a hydrostatic transmission and trans-axle drives both tractor unit wheels with equal torque so that a straight line can be maintained without steering effort on the handlebars of the striper unit. The transmission also provides forward and reverse drive and a static brake. This trans-axle driver array is implicitly involved in effecting steering and significantly reduces the turning radius of the coupled tractor-striper array.

Other objects features and advantages of the striper provided by this invention will be found throughout the following description, claims and appended drawings.

BRIEF DESCRIPTION OF THE DRAWINGS

In the appended drawings, wherein like reference characters are used in the respective views to designate similar features to facilitate comparison:

FIG. 1 is a side view sketch of the ride-on tractor unit afforded by this invention as a rear drive unit attachable to a utility vehicle such as a hand steered walk-behind paint striper;

FIG. 1A is a fragmental section view showing the manner of pivotably rotating the framework and motor of the tractor unit about the two drive wheels for coupling to a striper or resting upon a rear roller when disconnected;

THE PREFERRED EMBODIMENT

Figure 2:
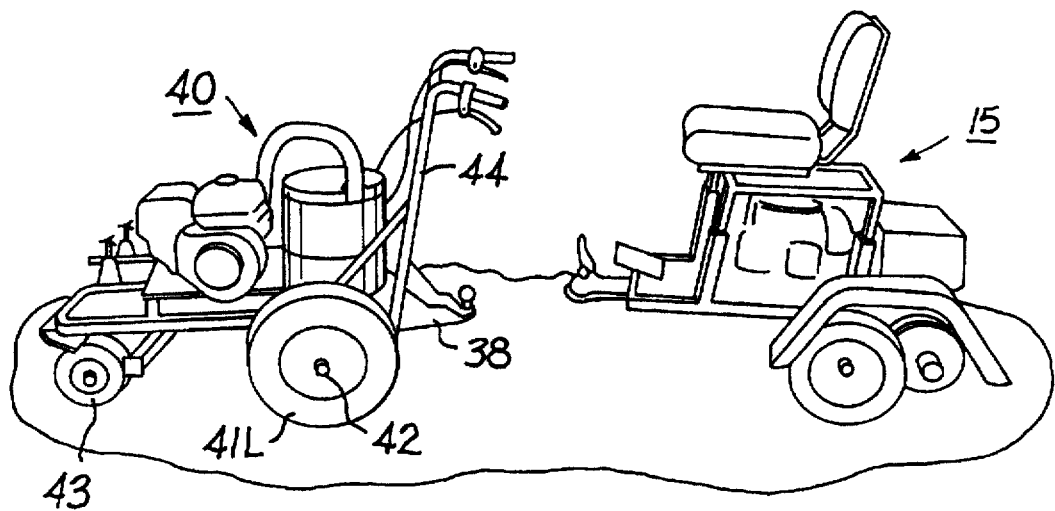
FIG. 2 is a perspective view of the tractor unit having a rear tool box ledge being positioned to connect in an articulation joint behind a handlebar-steered, three-wheel manual push-behind paint striper by way of an intermediate ball-socket hitch.

The two wheeled tractor drive unit 15 afforded by this invention is shown in FIGS. 1 and 1A. A framework 16 is balanced to rotate about the coaxial drive axles 17 provided independently for the two wheels 18R and 18L. The front articulation socket joint assembly 19 has a quick release mechanism 20 for attachment to a ball hitch connector on a driven utility vehicle in a push drive tractor mode. The tool box 21 may be carried on the back ledge of the framework 16. This toolbox may in part carry a reservoir for hydraulic aid for the hydrostatic drive (later described).

The motor 22 is mounted on slidable chassis 23, which moves back and forth, as indicated by arrow 24, for adjusting the tension on the drive belt (64, FIG. 6) that turns the wheels 18, which have twelve inch pneumatic tires through an intermediate hydrostatic trans-axle transmission. The engine power, typically 5 to 8 HP, is sufficient to drive a walk-behind paint striper unit, with the driver seated in seat 26, at about six MPH painting speed and about 15 MPH transport speed, as compared with the approximately one MPH manual pushing-to-paint speed. The motor can be driven forward or reverse by control of the foot pedal lever 20. Lever 27 is the engine speed and kill switch.

Figure 3:
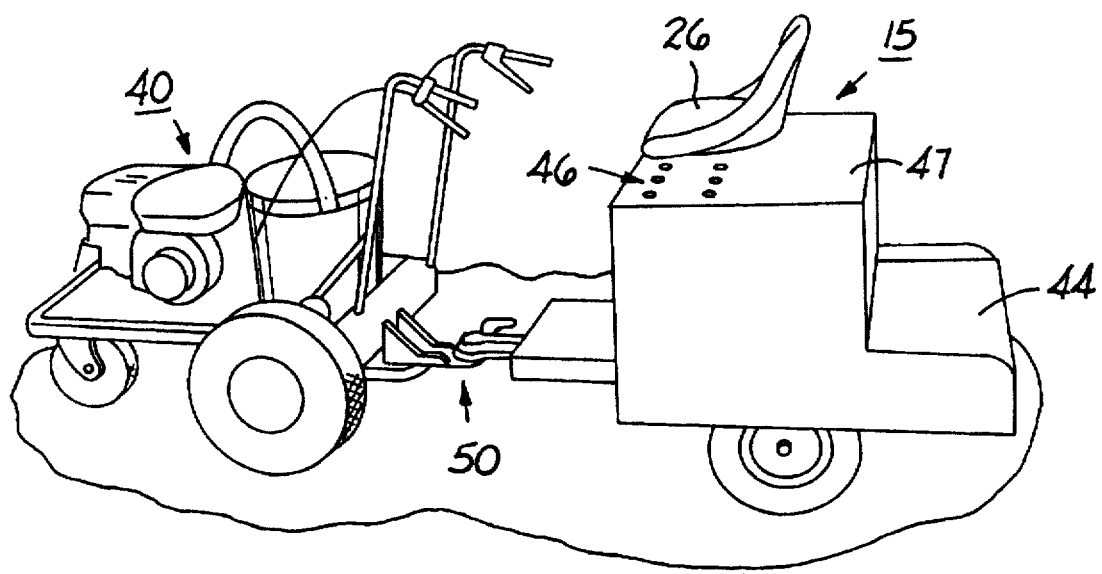
FIG. 3 is a perspective view of an embodiment of the invention coupling together tractor and paint striper units that shows the movable seat positioned on a body to be positioned on either the left hand side or the right hand side of the striping assembly.

The seat 26 may be adjustably mounted for upward and downward telescopic height adjustments 30, 31 as indicated by the adjacent two headed arrows. Forward-reverse positioning of the seat upon the frame is indicated by arrow 32. To provide better viewing of the striping, it is significant that a transverse seat positioning system is used such as shown in FIG. 3. The seat assembly is pivotable from joint 33 to tilt forward placing the seat back 35 downwardly for stowing the seat into storage position shown in phantom for loading into a pick-up truck in a small-volume, low-profile storage mode for transport, preferably with some kind of bistable positioning latches (not shown). A typical storage dimension is 50 inches long by 44 inches wide by 28 inches high.

The roller 27 mounted on the rear allows the front hitch bar 28 to be picked up for resting the unit on the roller 27 without damage to the drive sprockets 25. Storage in this or a vertical upright position constitutes a safety measure reducing the probability that the engine might be started with a horizontally disposed hitch bar thus being thrust upward when there is no front utility vehicle coupled thereto.

As shown in FIG. 2, the two wheeled rear drive tractor unit 15 couples by way of trailer hitch ball attachment 38 to the manually operable push paint striper unit 40. This preferred striper unit 40 is a three wheeler with two rear wheels 41 carried on axle 42 and a front pivot wheel 43. The striper unit is a standard walk behind model steered by a handlebar assembly 44.

In FIG. 3, it is seen that the only connection between the rear tractor unit 15 and the front striper unit 40 is the pivot joint 50 that permits the two units to articulate, typically with a turning radius of eighty degrees achieved by operation of the hydrostatic trans-axle transmission drive unit of this invention. With this simple articulation joint, there is no problem of connecting feed lines, painting paraphernalia or power transfer mechanisms between the two articulated units 15, 40. The articulation coupling is a simple socket-ball joint 50 pivot which facilitates use of the tractor unit on various vehicles. When the tractor 15 is coupled together with striper 40, the assembly is easily driven up or backed down a ramp for a trailer or truck.

In this embodiment a body 47 surrounds the motor assembly. The seat 26 is positionable either on the right edge or the left edge of the tractor unit 15 as indicated by the mounting structure 46. The back ledge 44 can carry several cans of paint, and two persons may ride on the ledge facing the rear.

Figure 4:
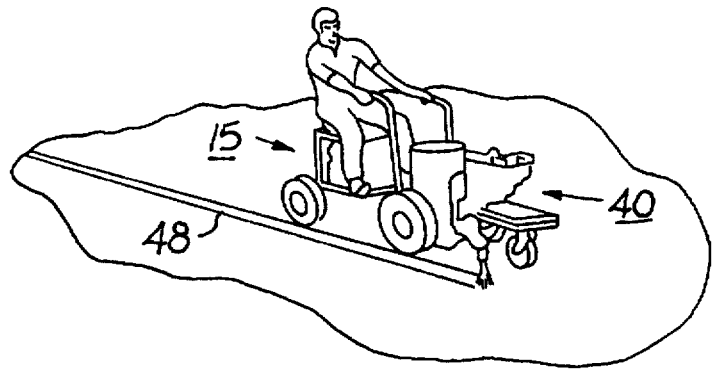
FIG. 4 is a perspective view of the tractor driven paint striper of this invention in use as stripes are being painted along the right hand side of the striper.

FIG. 4 illustrates the visibility of the driver in laying downstripes 48 at the right edge of the coupled paint striper. The front paint striping unit 40 may be one of several commercially available walk-behind paint stripers, but needs to have the capacity to paint at a travel speed of about six miles an hour. The speed may be increased for straight line running and a smooth radius. The self-sufficient hand propelled striper in all cases has a steering mechanism, which could be a steering wheel instead of handlebars. The striper accessories may include different painting jets, dual heads, wide stripe heads and timing and gapping mechanisms.

As seen in FIG. 3, the tractor is preferably perfectly balanced without any ballast or adaption as to height for connection with "Graco 3500" and "5000 Laser Liner" commercial hand pushed stripers. Some other commercial brand stripers operable with the tractor unit provided by this invention are: "AirLessco 3100 GSC", "Lunay Liner", "Kelly-Creswell Heavy Duty C", "Little Hug", "Titan Speed /Flow", "Neal", and "Binks". The tractor unit may also be used with other utility vehicles and may carry accessories such as motorized cable winders, cable stretchers, glass bead dispensers, and electronic speed indicators, and is further useful to carry various accessories and attachments such as skip line timer, layout devices and airport runway striping accessories.

Figure 5:
FIG. 5 is an enlarged fragmental perspective left side view of the striper assembly showing the driver seated in working position on the rear-drive tractor unit above the motor drive mechanism.
Figure 6:
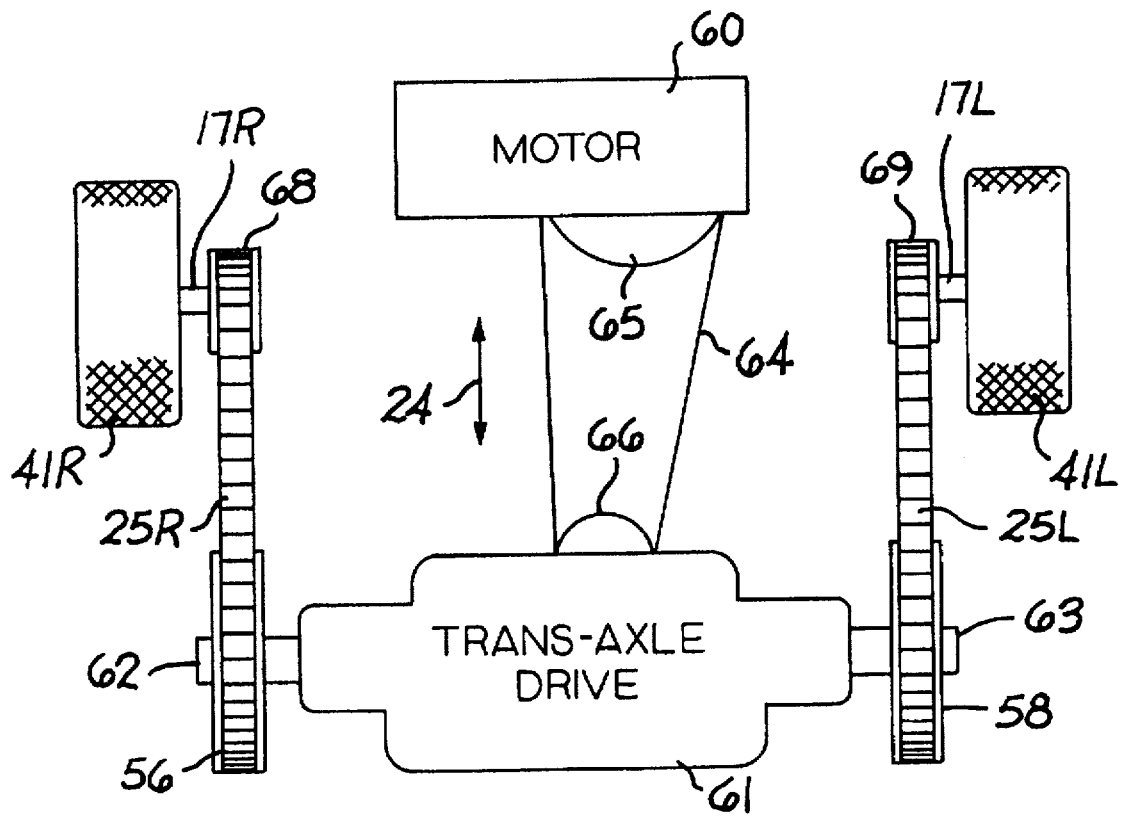
FIG. 6 is a diagrammatic sketch of the hydrostatic transaxle transmission drive system afforded by this invention.

In the FIG. 5 view, the power shaft 55, upon which cogwheel 56 is affixed on the left tractor side rotates from motor power, and drives the wheel shaft 17 with the sprocket chain 25 through a pinion cogwheel affixed to the wheel shaft 17 (68, FIG. 6). The adjustable motor mount 23, as aforesaid, permits the motor to slide through an adjustment range for establishing the drive belt tension. The right tractor side cogwheel 58 has its corresponding chain attached to a drive pinion cogwheel on the opposite wheel coupled to a second axle of the intermediate trans-axle assembly coupled to the motor by a belt drive (61, FIG. 6).

The driver's right foot engages hydraulic control drive pedal 59, which is mounted on a shaft (not shown) for lateral adjustment. A static (default) brake mechanism is operable by the hydrostatic transmission unit in the center position of the right foot pedal 59.

The right pedal foot down provides a variable speed forward and the right pedal foot up provides a variable speed reverse. The paint striping unit 40, may be a standard commercial unit modified by attachment of the ball-hitch bracket 28, and is preferably of the handlebar-steered, three-wheeled type with a front pivot wheel for best maneuverability and for permitting the driver to grasp the handlebars and operate the striper in a customary manner for putting down stripes.

The quickly detachable tractor drive unit 15 very quickly provides a transition from one paint color to another in the striper unit 40, by merely changing striper units so that the striper unit 40 does not require cleaning and reloading of paint for processing different colors.

As may be seen from the schematic diagram of FIG. 6, the motor 60 is coupled by belt 64 from belt drive wheel 65 to the belt drive wheel 66 on hydrostatic transmission 61 with trans-axles 62, 63 carrying the chain drive sprockets 56, 58. The arrow 24 represents the relative movement of the motor 60 and transmission 61 for keeping V-drive belt 64 tension properly adjusted. The drive chains 25R and 25L respectively couple the drive sprockets 56, 58 to the pinion gears 68 and 69 attached to the drive shafts 17R and 17L for the respective drive wheels 41R and 41L. Such trans-axle hydrostatic drive units are available as Model K60 from John Deere & Co., for example.

This drive train is significant in the steering and operation of the tractor unit 15. It provides forward and reverse variable speed drive and static brakes connected by default in neutral drive, operable from the right foot pedal 59. Also it has a hand type emergency brake on the transmission unit.

The hydrostatic drive unit produces equal torque on both wheels. This feature in the tractor push mode of transport permits the unit to steer in a straight line without manual steering force on the handlebars. Also this drive produces a short turning radius. In effect the hydrostatic drive unit comprises a novel steering mechanism that assists and cooperates with the handlebar manipulation of the striper unit.

The motor 60 and trans-axle drive 61 is carried on a framework (16, FIG. 1) with a load carrying body, preferably balanced about a vertical plane passing through the coaxially aligned wheel axles 17R and 17L.

It is therefore seen that this invention provides a novel ride-on rear-push tractor drive unit for powering a front utility vehicle unit such as a paint striper from a ball-socket type articulation joint, where the tractor unit drives and steers the utility vehicle unit. In the two units, the striper unit has a resident motor dedicated to the paint striping function and the tractor unit has a separate motor dedicated to propulsion and steering assistance of the coupled machines.

Those novel features incorporating the nature and spirit this invention are set forth with particularity in the following claims.

I claim:

1. A power-driven ride-on steerable paint striper machine comprising in combination: a motorized and ridable two-wheeled push tractor unit, a wheeled steerable paint striping unit, a pivotable coupling joint joining said units into an articulated motor driven tractor-striper assembly with said coupling joint positioned with the wheeled steerable paint striping unit in front and said motorized push tractor unit in the rear for moving the paint striper under control of a driver riding on the tractor unit and steering means comprising an equal torque drive mechanism for the two tractor wheels which steers the paint striping unit for the painting of a straight line without manual steering force on the paint striping unit.

2. The striper machine of claim 1 having a motor in the tractor unit dedicated to propulsion of the striper machine, and a separate motor in the paint striping unit dedicated to the paint striping function.

3. A power-driven ride-on steerable paint striper machine comprising in combination: a motorized and ridable two-wheeled push tractor unit, a wheeled steerable paint striping unit, a pivotable coupling joint joining said units into an articulated motor driven tractor-striper assembly with said coupling joint positioned with the wheeled steerable paint striping unit in front and said motorized push tractor unit in the rear for moving the paint striper under control of a driver riding on the tractor unit, steering means comprising an equal torque drive mechanism for the two tractor wheels thereby facilitating the painting of a straight line, and a driver seat on the tractor unit adjustable laterally from side to side to positions on opposite lateral sides of the tractor unit to permit driver monitoring of stripes being painted from corresponding sides of the paint striping unit.

4. A power-driven ride-on steerable paint striper machine comprising in combination: a motorized and ridable two-wheeled push tractor unit comprising, two drive wheels, a hydrostatic trans-axle transmission drive and means for driving the two drive wheels independently from said transmission drive, a wheeled steerable paint striping unit, a pivotable coupling joint joining said units into an articulated motor driven tractor-striper assembly with said coupling joint positioned with the wheeled steerable paint striping unit in front and said motorized push tractor unit in the rear for moving the paint striper under control of a driver riding on the tractor unit, and steering means comprising an equal torque drive mechanism for the two tractor wheels thereby facilitating the painting of a straight line.

5. The striper machine of claim 4 configured to permit a turning angle of the order of 80 degrees in response to said pivotable coupling joint which further comprises a ball-socket mechanism.

6. The striper machine of claim 5 wherein the paint striping unit carries a trailer hitch type ball portion of the ball-socket mechanism.

7. The combination of a steerable walk-behind paint striping unit and a disconnectable push-drive two-drive-wheeled motorized tractor unit, comprising in combination: propulsion means confined in said tractor unit; a front hitching member coupled to the tractor unit presenting a pivotable coupling attachment articulated with said steerable walk-behind paint-striping unit provided with a mating pivotable coupling attachment in a push-to-drive relationship; a driver's seat positioned on the tractor unit to sit a driver in riding position for controlling a coupled paint-striping unit; a drive motor confined on the tractor unit; and transmission means coupling the motor to the two drive wheels for transport of the seated driver and said striping unit comprising a hydrostatic trans-axle drive transmission for providing equal torque drive to said two drive wheels.

8. The combination defined in claim 7 wherein said transmission means further comprises manually controllable means to move the wheels in forward and reverse drive modes.

9. The combination defined in claim 8 wherein said transmission means further comprises braking means, and the manually controllable means further comprises a control lever movable from a default braking position in opposite directions toward higher speed forward and reverse drive positions respectively.

10. The combination of a steerable walk-behind paint striping unit and a disconnectable push-drive two-drive-wheeled motorized tractor unit, comprising in combination: propulsion means confined in said tractor unit; a front hitching member coupled to the tractor unit presenting a pivotable coupling attachment articulated with said steerable walk-behind paint-striping unit provided with a mating pivotable coupling attachment in a push-to-drive relationship; a driver's seat positioned on the tractor unit to sit a driver in riding position for controlling a coupled paint-striping unit; a drive motor confined on the tractor unit; and transmission means coupling the motor to the two drive wheels for transport of the seated driver and said striping unit wherein said driver's seat further comprises, a mechanism for laterally positioning the driver's seat at different positions on opposite sides of the tractor unit.

11. The combination of a motorized ridable push tractor having two drive wheels, said tractor being articulated to push a walk-behind steerable paint striping unit, characterized by means in said tractor unit for providing equal drive torque to said two drive wheels thereby steering said paint striping unit for painting of a straight line without the exertion of manual steering control.

12. A power-driven ride-on paint striper machine comprising in combination, a motorized and ridable two-wheeled push tractor unit, a wheeled steerable independently operable manually pushed paint striping unit, said units being coupled in an articulated joint consisting of a mechanical coupling joint that maintains each of said units as an independent unit, foot operated controls for driving the tractor unit leaving the hands free for operating the striping unit and a driver seat on the tractor unit adjustable laterally from side to side positions on opposite lateral sides of the tractor unit to permit driver monitoring of stripes being painted from corresponding sides of the paint striping unit.

13. The striper machine of claim 12 wherein the tractor unit includes means for reversing drive direction to pull the paint striping unit, and means for operating the striper to paint in the reverse drive direction.

* * * * *